United States Patent [19]
Stotz

[11] Patent Number: 5,645,517
[45] Date of Patent: Jul. 8, 1997

[54] DEFLECTION ADJUSTING ROLL

[75] Inventor: Wolf Gunter Stotz, Ravensburg, Germany

[73] Assignee: Voith Sulzer Papiermaschinen GmbH, Heidenheim, Germany

[21] Appl. No.: 506,210

[22] Filed: Jul. 24, 1995

[30] Foreign Application Priority Data

Jul. 27, 1994 [DE] Germany ............... 44 26 513

[51] Int. Cl.$^6$ ................................................. B21B 27/00
[52] U.S. Cl. ................................. 492/7; 492/16; 492/20
[58] Field of Search .......................... 492/7, 16, 2, 20; 162/358.1

[56] References Cited

U.S. PATENT DOCUMENTS

| | | | |
|---|---|---|---|
| 4,709,624 | 12/1987 | Appenzeller et al. | 100/162 B |
| 4,757,586 | 7/1988 | Niskanen | 492/7 |
| 4,984,343 | 1/1991 | Schrörs | 492/7 |
| 4,985,972 | 1/1991 | Sollinger et al. | 492/7 |
| 5,487,715 | 1/1996 | Schiel | 492/16 |
| 5,509,883 | 4/1996 | Niskanen et al. | 492/20 |

FOREIGN PATENT DOCUMENTS 2736656  2/1979  Germany .

OTHER PUBLICATIONS

German Patent Office Action P 44 26 512.3, filed Jul. 27, 1994.

German Patent Office Action P 44 26 513.1, filed Jul. 27, 1994.

*Primary Examiner*—Irene Cuda
*Attorney, Agent, or Firm*—Greenblum & Bernstein P.L.C.

[57] ABSTRACT

Deflection adjusting roll. A deflection adjusting roll includes a plurality of hydraulic support elements for a roll jacket, wherein the support elements are provided with hydraulic pressure medium via a bore axially extending in common with the carrier as well as via further radial bores discharging into the axially extending bore with the radial bores being in communication with the support elements and separate pressure control of the pressure medium for each support element is achieved in that each one of the radially extending bores is associated with a controllable sealing and throttling element, with the sealing and throttling element being slidably disposed within the axially extending bore and so shaped and pressed against the inside surface of the axial bore that at least one connecting channel is provided between the axial bore and the radial bore, whereby the flow-through quantity of the hydraulic pressure medium is controllable via the cross section of the connecting channel.

29 Claims, 1 Drawing Sheet 5,645,517

DEFLECTION ADJUSTING ROLL

CROSS REFERENCE TO RELATED APPLICATIONS

This application claims the priority of German Patent Application No. P 44 26 513.1, filed Jul. 27, 1994, the disclosure of which is incorporated herein by reference in its entirety.

BACKGROUND OF THE INVENTION

1. Field of the Invention

This invention pertains to a deflection adjusting roll comprising a fixed carrier and a roll jacket, with the roll jacket being rotatable about the carrier, wherein the roll jacket is supported on a plurality of hydraulic support elements, with the support elements being provided with a hydraulic pressure medium via a bore axially extending in common with the carrier as well as via further bores, discharging into the axially extending bore, with the further bores also being in communication with at least each one of the support elements and being substantially radially extending. Such deflection adjusting rolls are utilized in compacting rolls or smoothing rolls for fiber webs or bands of the papermaking industry.

2. Discussion of the Background of the Invention and Material Information

Rolls of that type are already known, wherein the pressure of the hydraulic pressure medium is supplied to support elements via individually controlled devices, with such devices generally being located outside of the roll. Only the cross section of the roll, that is of the roll carrier, limits the number of inlets and thus thereby also the number of the independently controllable pressure zones of the roll.

For this reason, German Patent Publication DE-PS 27 36 656 suggests a solution, wherein pressure regulators, connected with the inlets and associated with the support elements, are insertable into a bore of the carrier of the roll. In this manner, the pressure regulators are hydraulically pressed in the direction of the connecting bore of each support element, so that a sealed connection is provided between the inlet and the connecting bore via the pressure regulator. However, these devices are too expensive to fabricate.

Thus, it is the task or object of this invention to produce a deflection adjusting roll whose arrangement, for the individual pressure control of the pressure medium supplied to the support elements, is simply constructed and can be located within the deflection adjusting roll.

SUMMARY OF THE INVENTION

This task or object is solved or achieved, in accordance with a first embodiment of this invention, via a deflection adjusting roll comprising a fixed carrier and a roll jacket, with the roll jacket being rotatable about the carrier, wherein the roll jacket is supported on a plurality of hydraulic support elements, with the support elements being provided with a hydraulic pressure medium via a bore axially extending in common with the carrier as well as via further bores, discharging into the axially extending bore, with the further bores also being in communication with at least each one of the support elements and being substantially radially extending, wherein each one Of the radially extending bores is associated with a controllable sealing and throttling element, with the sealing and throttling element being slidably disposed within the axially extending bore of the carrier, for influencing the passage of the pressure medium and the sealing and throttling elements are so shaped and are pressed, via at least one biasing element each, against an inside surface of the axially extending bore, so that at least one connecting channel, for the pressure medium, between each of the radially extending bores and the axially extending bore, is provided and that at least the cross section of this connecting channel of the respective sealing and throttle element is controllable via an actuator.

In a further embodiment of the deflection adjusting roll of this invention, the sealing and throttling elements, at least with reference to a directional component in the direction of the discharge of the radially extending bores, is pressed, via the biasing elements against the inside of the axially extending bore.

In another embodiment of the deflection adjusting roll of this invention, the biasing element takes the form of a biased spring element.

In a differing embodiment of the deflection adjusting roll of this invention, the sealing and throttling elements are axially interconnected. Preferably, the sealing and throttling elements are indirectly connected via a carrier element slidably extending in the axially extending bore of the carrier.

In yet a further embodiment of the deflection adjusting roll of this invention, the actuator of each sealing and throttling element, that influences the cross section of the connecting channel, is connected via at least one control conduit with a control unit located outside of the deflection adjusting roll.

In yet another embodiment of the deflection adjusting roll of this invention, the actuator of each sealing and throttling element, that influences the cross section of the connecting channel, takes the form of one of an electric and hydraulic positioning element and the control conduits take the form of one of electrical and hydraulic conduits.

In yet a differing embodiment of the deflection adjusting roll of this invention, a side of the throttling element, that is pressed against the inside surface of the axially extending bore of the carrier, has a specific profile.

In still a further embodiment of the deflection adjusting roll of this invention, each radial bore includes a discharge region, with each discharge region being formed as a raised area relative to the inside surface of the axially extending bore.

Via the previously described manner, since each of the bores, extending radially relative to the support element, is respectively associated with a controllable sealing and throttling element, for controlling the through flow of the pressure medium, slidably arranged in the axially extending and fluid pressure medium-filled bore of the carrier, this reduces the sealing problems between the pressure regulator and the inside of the axial bore which, for example, is present in already previously noted German Patent Publication DE-PS 27 36 656, so that, for that reason, a throttling element, having a relatively weak biasing element, is provided. In addition, minor leaky locations do not lead to a loss of pressure at the respective support element but rather to a steady low pressure in the pressure chamber of the support element which, within limits, is harmless and possibly is even desirable.

Since the sealing and throttling elements are so constructed and are pressed against the inside surface of the axial bore via at least one biasing element, so that at least one connecting channel for the pressure medium is provided between each of the radial or axial bores and the through flow quantity or passage of the pressure medium is controllable via an actuator or a positioning element, a relatively simple and complete assembly of the device is achieved.

It is important in this matter that, the inner pressure in the axial bore emanating from the pressure medium itself, provides for the pressing of the sealing and throttling element so that a relatively weak biasing element is sufficient. In all of these observations it is of course a prerequisite that the discharge of the radial bore is covered by the discharge region of the connecting channel of the sealing and throttling element.

A spring element or member, causing a slight prestress or bias, serves as a biasing element since, in addition to the already previously noted slight pressing force, no special devices are required for permitting a quick pressure release with reference to the pressure chambers of the support elements. In the case of a quick relief or unloading of the support elements, if the applied pressure emanating from the biasing element as well as the pressure medium in the axial bore and acting upon the sealing and throttling element against the inside surface of the axial bore, is less than the opposing pressure of the pressure medium in the radial bore, this leads to the lifting of the sealing and throttling element from the inside surface of the axial bore and thus to the discharge or drainage of the pressure medium from the radial bore and into the axial bore until there is an equilibrium or balancing of the pressures.

In order to limit the cross section of the connection between the radial and axial bore to the desired dimension, the sealing and throttling element should be pressed, at least with reference to a directional component, in the direction of the discharge of the radially extending bore, via the biasing elements, against the inside surface of the axially extending bore.

In order to enhance the removal of the sealing and throttling elements, it is advantageous if they are axially interconnected. This can be accomplished via a carrier element that is insertable into the axially extending bore of the carrier.

The through flow quantity of the pressure medium, with reference to each individual connecting channel, is preferably affected via actuators or positioning elements, each of which is connected with at least one control conduit via a control unit located outside of the deflection adjusting roll. These actuators or positioning elements are particularly developed as electric or hydraulic actuators or positioning elements together with their associated electric or hydraulic lines or conduits. It can also be an advantage if, during an interruption of the supply of energy, the position of the actuators can be maintained.

BRIEF DESCRIPTION OF THE DRAWINGS

The invention will be better understood and objects other than those set forth above will become apparent when consideration is given to the following detailed description with reference to one embodiment thereof, wherein the directional references to axial and radial should always be interpreted with reference to the deflection adjusting roll. Such description makes reference to the annexed drawings wherein throughout the various figures of the drawings, there have generally been used the same reference characters to denote the same or analogous components and wherein.

DETAILED DESCRIPTION OF THE PREFERRED EMBODIMENTS AND BEST MODE

Figure 1:
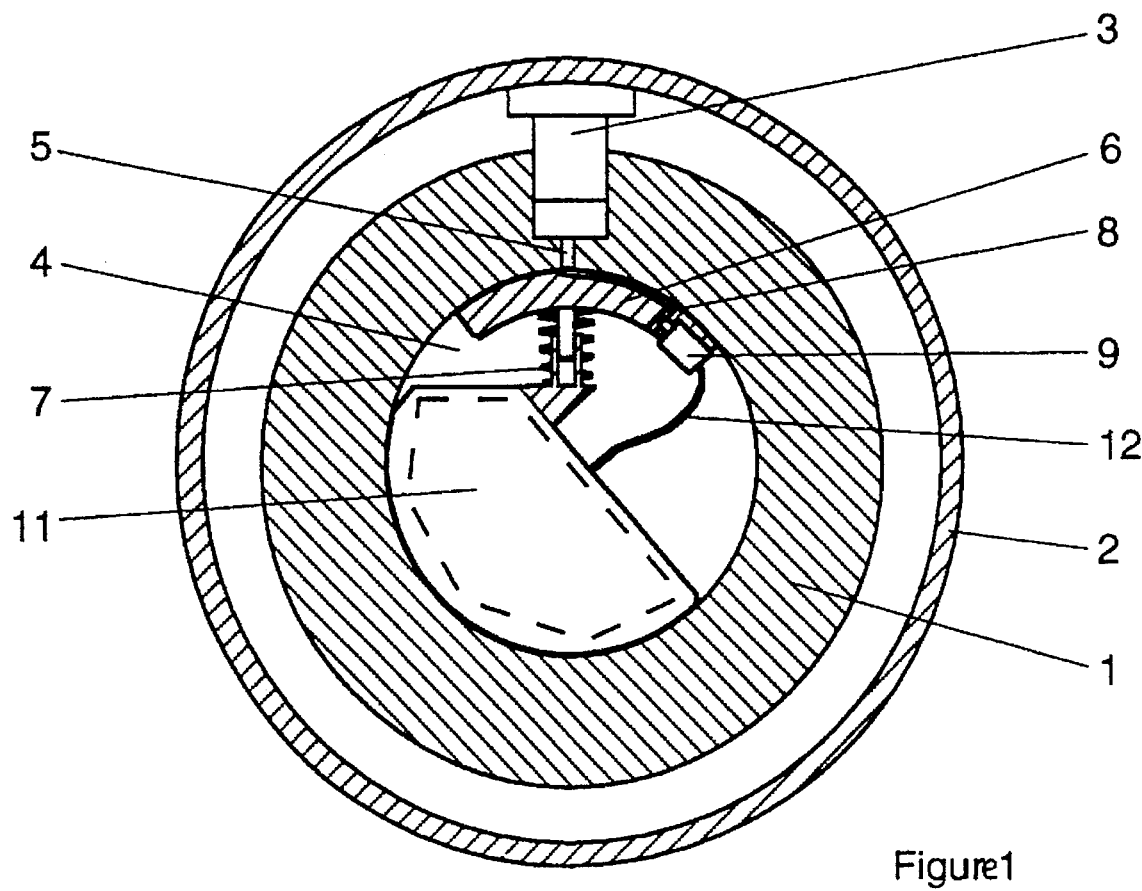
FIG. 1 is a schematic cross section of a deflection adjusting roll with one embodiment of the sealing and throttle element of this invention.

With respect to the drawings it is to be understood that only enough of the construction of the invention and the surrounding environment in which the invention is employed have been depicted therein, in order to simplify the illustrations, as needed for those skilled in the art to readily understand the underlying principles and concepts of the invention.

In the example of the one embodiment, the deflection adjusted or adjustment roll is provided with a fixed carrier 1 and a roll jacket or covering 2, rotatable around carrier 1, with roll jacket 2 being supported on hydraulic support elements 3 that are supplied with hydraulic pressure medium via a bore 4 axially extending in common with carrier 1 as well as via further bores 5, discharging into bore 4, with the further bores 5 being in connection with each of support elements 3. In order to achieve a hydraulic pressure increase, a throttled discharge of the pressure medium must be provided from the hydraulic pressure chamber of support element 3. This can be achieved via at least, for example, a throttled conduit extending directly in the interior of the roll jacket or extending to hydrostatic bearing pockets of the support element 3.

In addition, each one of the radially extending bores 5 is associated with a controllable sealing and throttling element 6, with sealing and throttling element 6 being slidably disposed within the axially extending bore 4 of carrier 1. Sealing and throttling elements 6 extend over a portion of the inside of axial bore 4 and are, with reference to the touching side, adapted as best possible to the form or shape of the inside surface of axial bore 4. Via at least one biasing element 7, in the form of a spiral spring, sealing and throttling elements 6 are pressed, in the direction of the discharge of radial bores 5, against the inside surface of axial bore 4.

The spiral springs, which affect a preload or bias, are supported or biased against a carrier element 11, with the latter being insertable into and extending in axially extending bore 4 of carrier 1. This carrier element 11 is located approximately across from radial bores 5 in the inside of axially extending bore 4 and serves, at the same time, for interconnecting sealing and throttling elements 6. This connection is, however so accomplished that radial movement is assured between each sealing and throttling element 6 and carrier 11, which can be readily accomplished via any known guiding devices. Therewith, this enables not only the already-noted quick pressure equalization, from the radial bores 5 in the direction of the axial bore 4, but also the insertability of the sealing and throttling elements 6 into axial bore 4. The amount of through flow of the pressure medium is influenced per unit time via an actuator or positioning elements 9 of the sealing or throttling element, wherein same is connected via at least one hydraulic or electric control conduit 12 with a control unit located outside of the deflection adjusting roll and takes the form of an hydraulic or electric actuator or positioning element.

In this manner the cross section of the connecting channel 8, between radial bore 5 and axial bore 4, is only adjustably reduced at one location. This is occasioned via a slide in connecting channel 8 that is attached at an actuator or positioning element in any desired, well known, manner.

Control conduits 12 can, as indicated in the figures, extend within carrier element 11 or also freely extend in the intermediate space thereof.

Figure 2:
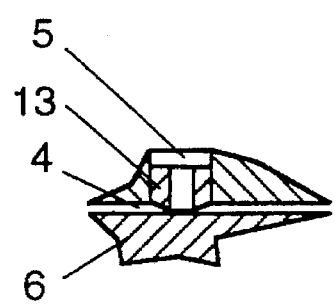
FIG. 2 is a partial schematic section of one embodiment of the discharge area of a radial bore into an axial bore.
Figure 3:
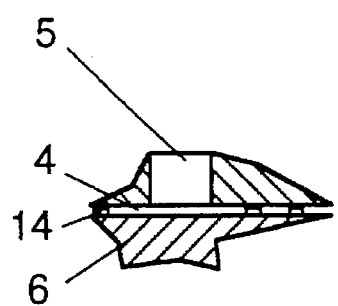
FIG. 3 is a partial schematic section of another embodiment of the discharge area of a radial bore into an axial bore.

In order to facilitate the pressure equalization between radial bore 5 and axial bore 4, at a very exact fitting between sealing and throttling element 6 and axial bore 4, starting at radial bore 5, it is of advantage if particularly the side of sealing and throttling element 6 that is pressed against the inside surface of axial bore 4, has the profile shown in FIG. 2. For the same reason, the discharge regions of radial bores 5 can respectively be shaped or formed as raised areas relative to the inside surface of axial bore 4. FIG. 3 illustrates an exemplary embodiment in which, in order to keep the manufacture of carrier 1 simple, radial bore 5 is provided with a discharge element 13 which, at least minimally, extends over the inside surface of axial bore 4 and which thereby distances sealing and throttling element 6 from the inside surface of axial bore 4. Discharge element 13 can, for example, be threaded or bonded into radial bore 5. The raised areas are greatly exaggerated and correspond in actual usage often only several thousands of a mm.

While there are shown and described present preferred embodiments of the invention, it is to be distinctly understood that the invention is not limited thereto, but may be otherwise variously embodied and practiced within the scope of the following claims and the reasonably equivalent structures thereto. Further, the invention illustratively disclosed herein may be practiced in the absence of any element which is not specifically disclosed herein.

What is claimed is:

1. A deflection adjusting roll comprising a fixed carrier and a roll jacket, with the roll jacket being rotatable about the carrier, wherein the roll jacket is supported on a plurality of hydraulic support elements, with the support elements being provided with a hydraulic pressure medium via a bore axially extending in common with the carrier as well as via further bores, discharging into the axially extending bore, with the further bores also being in communication with at least each one of the support elements and being substantially radially extending, wherein each one of the radially extending bores is associated with a controllable sealing and throttling element, with the sealing and throttling element being slidably disposed within the axially extending bore of the carrier, for influencing the passage of the pressure medium and the sealing and throttling elements are so shaped and are pressed, via at least one biasing element each, against an inside surface of the axially extending bore, so that at least one connecting channel, for the pressure medium, between each of the radially extending bores and the axially extending bore, is provided and that at least the cross section of this connecting channel of the respective sealing and throttle element is controllable via an actuator.

2. The deflection adjusting roll of claim 1, wherein the sealing and throttling elements, at least with reference to a directional component in the direction of the discharge of the radially extending bores, is pressed, via the biasing elements against the inside of the axially extending bore.

3. The deflection adjusting roll of claim 1, wherein the biasing element takes the form of a biased spring element.

4. The deflection adjusting roll of claim 2, wherein the biasing element takes the form of a biased spring element.

5. The deflection adjusting roll of claim 1, wherein the sealing and throttling elements are axially interconnected.

6. The deflection adjusting roll of claim 2, wherein the sealing and throttling elements are axially interconnected.

7. The deflection adjusting roll of claim 3, wherein the sealing and throttling elements are axially interconnected.

8. The deflection adjusting roll of claim 5, wherein the sealing and throttling elements are indirectly connected via a carrier element slidably extending in the axially extending bore of the carrier.

9. The deflection adjusting roll of claim 1, wherein the actuator of each sealing and throttling element, that influences the cross section of the connecting channel, is connected via at least one control conduit with a control unit located outside of the deflection adjusting roll.

10. The deflection adjusting roll of claim 2, wherein the actuator of each sealing and throttling element, that influences the cross section of the connecting channel, is connected via at least one control conduit with a control unit located outside of the deflection adjusting roll.

11. The deflection adjusting roll of claim 3, wherein the actuator of each sealing and throttling element, that influences the cross section of the connecting channel, is connected via at least one control conduit with a control unit located outside of the deflection adjusting roll.

12. The deflection adjusting roll of claim 5, wherein the actuator of each sealing and throttling element, that influences the cross section of the connecting channel, is connected via at least one control conduit with a control unit located outside of the deflection adjusting roll.

13. The deflection adjusting roll of claim 8, wherein the actuator of each sealing and throttling element, that influences the cross section of the connecting channel, is connected via at least one control conduit with a control unit located outside of the deflection adjusting roll.

14. The deflection adjusting roll of claim 9, wherein the actuator of each sealing and throttling element, that influences the cross section of the connecting channel, takes the form of one of an electric and hydraulic positioning element and the control conduits take the form of one of electrical and hydraulic conduits.

15. The deflection adjusting roll of claim 1, wherein a side of the throttling element, that is pressed against the inside surface of the axially extending bore of the carrier, has a specific profile.

16. The deflection adjusting roll of claim 2, wherein a side of the throttling element, that is pressed against the inside surface of the axially extending bore of the carrier, has a specific profile.

17. The deflection adjusting roll of claim 3, wherein a side of the throttling element, that is pressed against the inside surface of the axially extending bore of the carrier, has a specific profile.

18. The deflection adjusting roll of claim 5, wherein a side of the throttling element, that is pressed against the inside surface of the axially extending bore of the carrier, has a specific profile.

19. The deflection adjusting roll of claim 8, wherein a side of the throttling element, that is pressed against the inside surface of the axially extending bore of the carrier, has a specific profile.

20. The deflection adjusting roll of claim 9, wherein a side of the throttling element, that is pressed against the inside surface of the axially extending bore of the carrier, has a specific profile.

21. The deflection adjusting roll of claim 14, wherein a side of the throttling element, that is pressed against the inside surface of the axially extending bore of the carrier, has a specific profile.

22. The deflection adjusting roll of claim 1, wherein each radial bore includes a discharge region, with each discharge region being formed as a raised area relative to the inside surface of the axially extending bore.

23. The deflection adjusting roll of claim 2, wherein each radial bore includes a discharge region, with each discharge region being formed as a raised area relative to the inside surface of the axially extending bore.

24. The deflection adjusting roll of claim 3, wherein each radial bore includes a discharge region, with each discharge region being formed as a raised area relative to the inside surface of the axially extending bore.

25. The deflection adjusting roll of claim 5, wherein each radial bore includes a discharge region, with each discharge region being formed as a raised area relative to the inside surface of the axially extending bore.

26. The deflection adjusting roll of claim 8, wherein each radial bore includes a discharge region, with each discharge region being formed as a raised area relative to the inside surface of the axially extending bore.

27. The deflection adjusting roll of claim 9, wherein each radial bore includes a discharge region, with each discharge region being formed as a raised area relative to the inside surface of the axially extending bore.

28. The deflection adjusting roll of claim 14, wherein each radial bore includes a discharge region, with each discharge region being formed as a raised area relative to the inside surface of the axially extending bore.

29. The deflection adjusting roll of claim 15, wherein each radial bore includes a discharge region, with each discharge region being formed as a raised area relative to the inside surface of the axially extending bore.

* * * * *